US008964575B2

(12) United States Patent
Franceschini et al.

(10) Patent No.: US 8,964,575 B2
(45) Date of Patent: Feb. 24, 2015

(54) VIDEO-COMMUNICATION IN MOBILE NETWORKS

(75) Inventors: Daniele Franceschini, Turin (IT); Andrea Calvi, Turin (IT); Bruno Bottiero, Turin (IT); Gianni Guglielmi, Turin (IT); Alessandro Porta, Turin (IT); Stefano Oldrini, Turin (IT)

(73) Assignee: Telecom Italia S.p.A., Milan (IT)

( * ) Notice: Subject to any disclaimer, the term of this patent is extended or adjusted under 35 U.S.C. 154(b) by 2176 days.

(21) Appl. No.: 11/658,579

(22) PCT Filed: Jul. 25, 2005

(86) PCT No.: PCT/EP2005/008071
§ 371 (c)(1),
(2), (4) Date: Jan. 26, 2007

(87) PCT Pub. No.: WO2006/010583
PCT Pub. Date: Feb. 2, 2006

(65) Prior Publication Data
US 2008/0320526 A1    Dec. 25, 2008

(30) Foreign Application Priority Data

Jul. 27, 2004    (WO) ................. PCT/EP2004/008381

(51) Int. Cl.
*H04W 4/00*        (2009.01)
*H04L 12/26*       (2006.01)
*H04L 12/66*       (2006.01)
(Continued)

(52) U.S. Cl.
CPC .................................. *H04W 76/025* (2013.01)
USPC ...... 370/252; 370/329; 370/352; 370/395.21; 370/477; 348/14.02; 348/14.12; 455/67.11; 455/452.2; 725/118; 725/148

(58) Field of Classification Search
USPC .................... 370/252, 329, 352, 395.21, 477; 348/14.02, 14.12; 455/67.11, 452.2; 725/118, 148
See application file for complete search history.

(56) References Cited

U.S. PATENT DOCUMENTS 5,592,469 A * 1/1997 Szabo .......................... 370/342
6,026,097 A * 2/2000 Voois et al. .................. 370/468
(Continued)

FOREIGN PATENT DOCUMENTS

EP    1 298 945 A1    4/2003
EP    1 370 101 A1    12/2003
(Continued)

OTHER PUBLICATIONS

3GPP TS 43.055 V6.4.0 (Feb. 2004), Technical Specification; 3rd Generation Partnership Project; Technical Specification Group GSM/EDGE Radio Access Network; Dual Transfer Mode; Stage 2 (Release 6), pp. 1-32 (2004).
(Continued)

*Primary Examiner* — Alpus H Hsu
(74) *Attorney, Agent, or Firm* — Finnegan, Henderson, Farabow, Garrett & Dunner, L.L.P.

(57) ABSTRACT

A video-communication service in a mobile communication network using a packet-switched connection, in which a monitoring of a radio channel portion is performed at the mobile stations of the users involved in the communication. Parameters of the video communication (e.g. the coding rate) are adjusted based on a result of the monitoring of the radio channel portion.

45 Claims, 7 Drawing Sheets

(51) Int. Cl.
*H04B 17/00* (2006.01)
*H04W 40/12* (2009.01)
*H04W 72/08* (2009.01)
*H04W 76/02* (2009.01)

(56) References Cited

U.S. PATENT DOCUMENTS

| | | | | |
|---|---|---|---|---|
| 6,215,827 | B1 * | 4/2001 | Balachandran et al. | 375/262 |
| 6,374,112 | B1 * | 4/2002 | Widegren et al. | 455/452.2 |
| 6,608,832 | B2 * | 8/2003 | Forslow | 370/353 |
| 6,618,363 | B1 * | 9/2003 | Bahl | 370/329 |
| 6,771,964 | B1 * | 8/2004 | Einola et al. | 455/437 |
| 6,985,446 | B1 * | 1/2006 | Hurtta et al. | 370/249 |
| 6,990,078 | B2 * | 1/2006 | Kim et al. | 370/252 |
| 7,046,678 | B2 * | 5/2006 | Jiang et al. | 370/395.41 |
| 7,161,957 | B2 * | 1/2007 | Wang et al. | 370/468 |
| 7,197,327 | B2 * | 3/2007 | Koo et al. | 455/522 |
| 7,218,949 | B2 * | 5/2007 | Koo et al. | 455/522 |
| 7,280,809 | B2 * | 10/2007 | Lauterbach et al. | 455/115.1 |
| 7,295,549 | B2 * | 11/2007 | Pepin et al. | 370/352 |
| 7,310,499 | B2 * | 12/2007 | Magnusson et al. | 455/69 |
| 7,359,347 | B2 * | 4/2008 | Ahmavaara et al. | 370/328 |
| 7,460,553 | B2 * | 12/2008 | Riveiro Insua et al. | 370/437 |
| 7,526,289 | B2 * | 4/2009 | Schwarz et al. | 455/439 |
| 7,567,575 | B2 * | 7/2009 | Chen et al. | 370/401 |
| 7,602,791 | B1 * | 10/2009 | Jiang et al. | 370/395.41 |
| 7,630,339 | B2 * | 12/2009 | Laroia et al. | 370/330 |
| 7,643,786 | B2 * | 1/2010 | Soderbacka et al. | 455/3.01 |
| 7,822,044 | B2 * | 10/2010 | Lee et al. | 370/400 |
| 8,014,305 | B1 * | 9/2011 | Gilbert et al. | 370/252 |
| 8,369,217 | B2 * | 2/2013 | Bostica et al. | 370/232 |
| 2002/0075399 | A1 | 6/2002 | Nemiroff et al. | |
| 2002/0077064 | A1 | 6/2002 | Ue et al. | |
| 2002/0174434 | A1 * | 11/2002 | Lee et al. | 725/74 |
| 2003/0012217 | A1 * | 1/2003 | Andersson et al. | 370/437 |
| 2003/0081592 | A1 | 5/2003 | Krishnarajah et al. | |

FOREIGN PATENT DOCUMENTS

| | | |
|---|---|---|
| WO | WO 01/03461 A1 | 1/2001 |
| WO | WO 2004/045239 A2 | 5/2004 |
| WO | WO 2006/010373 A1 | 2/2006 |

OTHER PUBLICATIONS

U. Olsson et al., "Combinational Services—The Pragmatic First Step Toward All-IP," Ericsson Review No. 2, pp. 66-71 (2003).
"ECSD (Enhanced Circuit Switched Data)," ETSI SMG2 Working Session on EDGE, Tdoc SMG2 EDGE 033/99, Source: Nokia, pp. 1-15 (Mar. 1999).
Wang et al., "Video Processing and Communications," Prentice Hall, New Jersey, pp. 529-531 (2002).

* cited by examiner

VIDEO-COMMUNICATION IN MOBILE NETWORKS

CROSS REFERENCE TO RELATED APPLICATIONS

This application is a national phase application based on PCT/EP2005/008071, filed Jul. 25, 2005, and claims the priority under 37 C.F.R. 1.365(b) of International Application No. PCT/EP2004/008381, filed Jul. 27, 2004, the content of both of which is incorporated herein by reference.

TECHNICAL FIELD OF THE INVENTION

The present invention generally relates to video-communication in mobile telephony networks.

BACKGROUND OF THE INVENTION

Mobile telephony networks have initially been conceived for allowing voice communications, in a way similar to the Public Switched Telephone Networks, shortly PSTNs, but between mobile users. The mobile telephony networks have experienced and are experiencing an enormous spread, especially after the introduction of second generation mobile networks, and particularly of digital mobile networks, such as those conforming to the GSM ("Global System for Mobile communications") standard, and to the corresponding systems adopted in the United States and in Japan.

In way similar to the PSTNs, the second generation mobile networks are circuit switched networks; this greatly limits the bandwidth that can be allocated for a given user, especially in mobile networks of the second generation. On the contrary, data communications networks such as computer networks and, among these, the Internet, adopt packet switched schemes, that allow much higher data transfer rates.

Some solutions have been proposed for overcoming the limitations of the traditional circuit switched mobile networks such as the GSM networks, so as to allow the users of mobile terminals to exploit in efficient way the services offered through the Internet. One of the solutions that is acquiring a significant popularity is the GPRS ("General Packet Radio Service"). The GPRS is a digital mobile telephony technology compatible with the GSM networks (actually, it is built on the existing GSM network architecture) that allows data transfer at a higher speed than that allowed by the pure GSM. Essentially, the GPRS can be seen as an add-on to the GSM, that supports and enables packet data communication. Although third generation wireless communications systems such as those conforming to the standard UMTS ("Universal Mobile Telecommunication System") are more promising in terms of data transfer speed, the GPRS may represent a prompt solution to improve the data exchange capability in existing GSM networks.

The services offered by these mobile networks in addition to the simple vocal communications have quickly increased in number and quality; just to cite some examples, in the last few years short messaging services ("Short Messaging System", shortly SMS) and multimedia messaging services ("Multimedia Messaging System", or MMS), and Internet connectivity services have been made available.

In particular, there is a strong interest in providing multimedia services to the users of mobile communications networks, i.e., services enabling the possibility of adding images, video, or access to data through the Internet or through the electronic mail, to a communication between users that is made of the sole voice. Among these services, the so-called "combinational services" are attracting great attention by the mobile telephony operators. For the purposes of the present description, by "combinational service" there is, in general, intended a service through which a terminal of a mobile communications network can simultaneously open and use two connections, typically a circuit (circuit-switched or CS) connection and a packet (packet-switched, PS) connection.

U. Olsson and M. Nilsson, in the article "Combinational services—The pragmatic first step toward all-IP", Ericsson Review No. 2, 2003, describe, inter alia, an example of so-called "combinational services", in which the ability to simultaneously handle traffic on a circuit connection and on a packet connection is used: the sharing of images during a conversation. The authors notice that the possibility of simultaneously handle traffic on a circuit connection and on a packet connection is allowed both with the WCDMA (Wideband Code Division Multiple Access), giving the possibility to use multiple and parallel bearers in the "over-the-air" interface (multiple Radio Access Bearers, multi-RAB), and with the GSM, in which a standardized mechanism—the Dual Transfer Mode, or DTM—yields similar possibilities. In the article, the authors notice however that the mere technical possibility of "successfully crossing the air" is not enough. Sometimes it is forgotten that the average final user is not interested in the complications of the channels coding and wave propagation. Instead, the final user wants a mobile terminal that is reliable, simple to use, and well adapted to the current context. In other words, some entity in the mobile terminal has to interpret what the user is trying to do and translate it into a sequence of operations.

SUMMARY OF THE INVENTION

A problem that may arise on a packet-switched bearer used for transmission of a video from a mobile station is the possible variation of the maximum available throughput on the packet-switched bearer. This may cause unacceptable reception of the transmitted video in some situations, leading to an overall unsatisfactory perception of a video-communication or combinational service.

The Applicant has noticed that if the network resources are properly sized it can be assumed that the available bandwidth practically depends only on the radio quality conditions. A mechanism is thus introduced in the mobile station, aimed at the monitoring of the radio channel quality of the packet-switched connection. Based on the result of the monitoring, at least one parameter related to the quality of the video (e.g. the coding rate) is adjusted at the mobile station.

In a first aspect, the invention relates to a method of performing a communication between a first and a second user in a mobile communication network, the first and the second users being provided with respective first and second mobile stations. The method comprises:

establishing a packet-switched connection between said first and said second mobile station, the packet switched connection comprising at least one radio channel portion;

transmitting a video from said first to said second mobile station on said packet-switched connection;

monitoring a quality of said at least one radio channel portion;

adjusting at least one parameter related to said video based on a result of said monitoring of the quality of said radio channel portion.

In a second aspect, the invention relates to a mobile station adapted for performing a communication in a mobile communication network. The mobile station comprises:

a first unit adapted to code/decode at least a video component of the communication;

a second unit associated to the first unit, the second unit being adapted to establish at least a packet-switched connection comprising a radio channel portion, and to transmit said video component on said packet-switched connection;

a third unit adapted to monitoring a quality of said radio channel portion;

wherein said first unit is associated to said third unit, and said first unit is also adapted to adjust at least one parameter related to said video based on an output of said third unit.

Further features and advantages of the present invention will be made apparent by the following detailed description of preferred embodiments thereof, provided merely by way of non-limitative example, description that will be conducted by making reference to the attached drawings.

DETAILED DESCRIPTION OF PREFERRED EMBODIMENTS OF THE INVENTION

Figure 1:
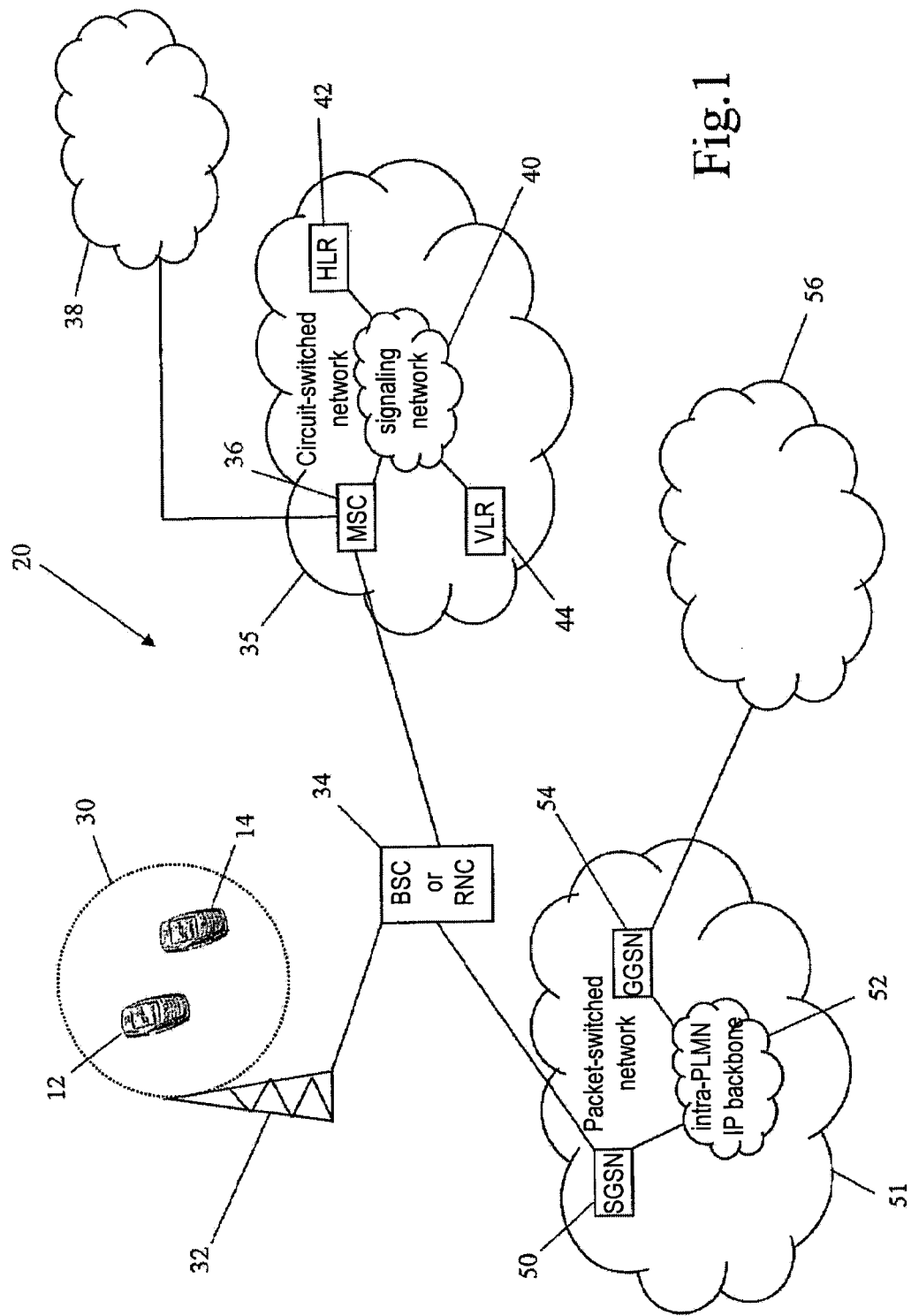
FIG. 1 shows an exemplary UMTS mobile communication network, supporting a video-communication service according to the invention.
Figure 2:
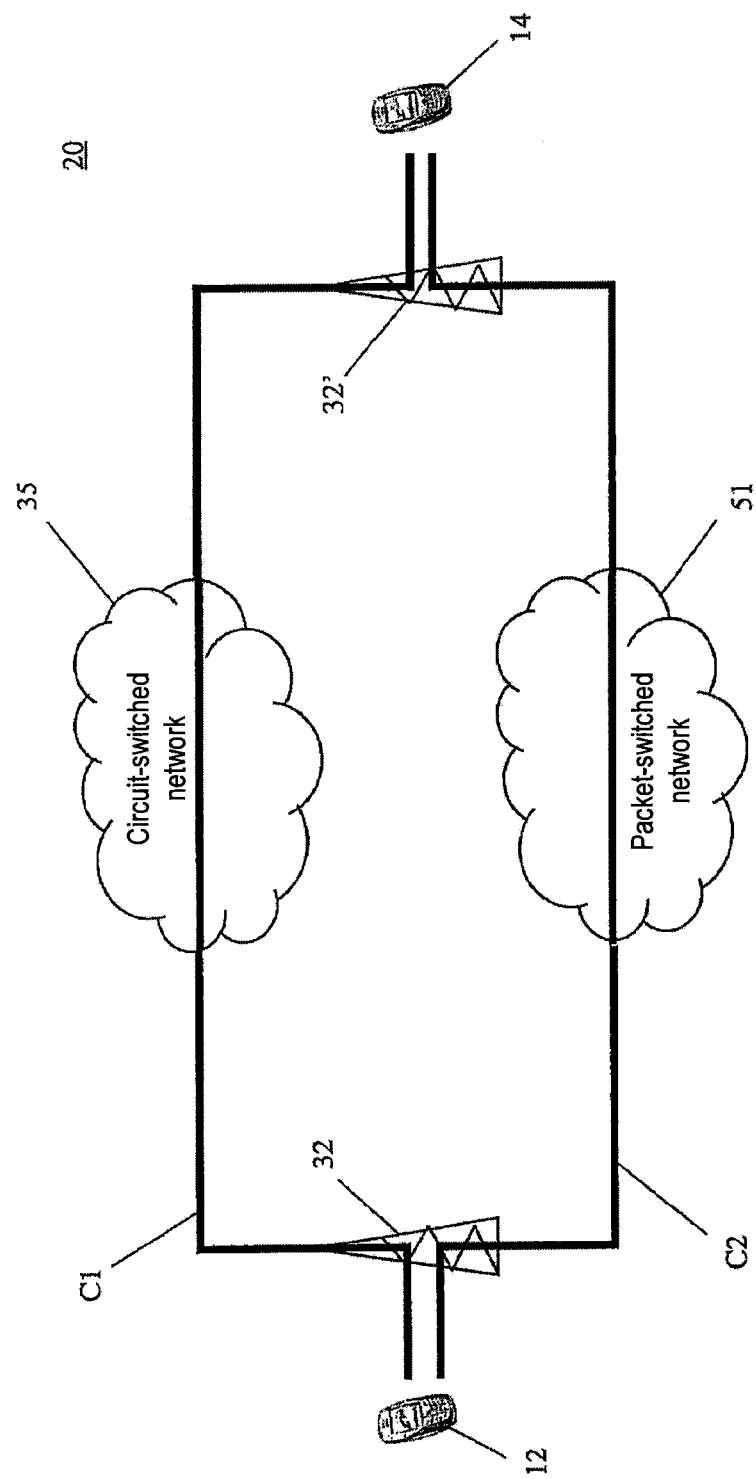
FIG. 2 schematically shows how to implement embodiments of a video-communication service according to the present invention.

FIG. 1 shows an exemplary mobile communications network 20, providing mobile telephony services according to the UMTS standard. It is noticed that a mobile network providing mobile telephony services according to the GSM/GPRS standard has a very similar structure to the mobile network of FIG. 1. The mobile network 20 supports both circuit-switched and packet-switched communications, and includes a circuit-switched network 35 and a packet-switched network 51. Mobile stations 12, 14 (e.g. cellular telephones, personal digital assistants, etc.) communicate over a radio interface with one or more base transmitter stations (BTSs) 32, or node-Bs. Each base transmitter station 32 provides service in a corresponding geographical area 30, generally known as cell. It is understood that the mobile network 20 provides service to a number of cells and to a number of mobile stations much higher than those shown for exemplary purposes in FIG. 1. Multiple base transmitter stations 32 are connected to a base station (or radio network) controller (BSC, or RNC) 34, which manages the allocation and de-allocation of radio resources and controls handovers of mobile stations from one base transmitter station to another. A base station controller and its associated base transmitter stations may be referred to as a base station subsystem (BSS). The BSC 34 is connected to a mobile switching center (MSC) 36 in the circuit-switched network 35, through which circuit-switched connections are set up within the network 20 and/or with other networks 38, such as a Public Switched Telephone Network (PSTN), Integrated Services Digital Network (ISDN), etc. In a widespread network, a plurality of BSCs, such as the BSC 34 shown in FIG. 2, is connected to a single MSC, and the network includes a plurality of MSCs.

The generic MSC 36 is also connected via a signaling network 40 (e.g. a Signaling System Number 7, or SS7, network) to a Home Location Register (HLR) 42, and to a Visitor Location Register (VLR) 44. The VLR 44 includes a database containing the information about all the mobile stations currently located in a corresponding location or service area, including subscriber information (typically temporary subscriber information) needed by the MSC to provide services in the circuit-switched network 35 to the mobile stations in its service area. Typically, when a mobile station enters a service area, the corresponding VLR 44 requests and receives data about the mobile station from the mobile's HLR and stores the same. As a result, when the visiting mobile station is involved in a call, the VLR 44 already has the information needed for call setup.

The HLR 42 comprises a database that stores and manages subscriptions of the users of the mobile network 20, such as the users owning the mobile stations 12, 14. For each "home" mobile subscriber, the HLR contains permanent subscriber data, such as the mobile station ISDN number (MSISDN), which uniquely identifies the mobile telephone subscription in the PSTN numbering plan, and an international mobile subscriber identity (IMSI), which is a unique identity allocated to each subscriber and used for signaling in the mobile networks. All network-related subscriber information is related to the IMSI. The HLR 42 also contains, in a so-called "profile", a list of services which a mobile subscriber is authorized to use along with a current subscriber location number corresponding to the address of the VLR currently serving the mobile subscriber.

Each BSC 34 also connects to the packet-switched network 51 at a Serving GPRS Support Node (SGSN) 50, responsible for the delivery of packets to the mobile stations within its service area. In a widespread network, a plurality of BSCs, such as the BSC 34 of FIG. 2, is connected to a single SGSN. Multiple SGSNs can be present in the network. At least one gateway GPRS support node (GGSN) 54 acts as a logical interface to "external" data packet networks such as the IP data network 56. The term "external" has to be understood as meaning a general purpose data network providing IP services (e.g. the Internet, or a company's Intranet, or local area network), being "external" with respect to the equipment needed for providing mobile telephony services to the mobile stations 12, 14. SGSN nodes 50 and GGSN nodes 54 are connected with each other by an intra-PLMN IP backbone 52. Typically, between the SGSN 50 and the GGSN 54, the Internet protocol (IP) is used as the backbone to transfer data packets.

The exemplary mobile network 20 of FIG. 1 supports embodiments of mobile video-communication services according to the invention, the implementation of which is schematically shown in FIG. 2. With reference to FIG. 2, a first user owning the first mobile station 12 places a voice call to a second user owning the second mobile station 14. The first mobile station 12 is camping under a BTS 32, and the second mobile station 14 is camping under a BTS 32', which may be the same BTS under which the first mobile station is camping or a different one.

The voice call is established as a circuit-based connection, so that it is routed by the circuit-switched network 35 of the mobile network 20 in a first bidirectional connection C1.

A second connection C2 is established between the mobile stations 12, 14 for supporting a video component to be exchanged between them. The second connection C2 may be a unidirectional or a bidirectional connection between the first mobile station 12 and the second mobile station 14. The second connection C2 is established as a packet-based connection, so that it is routed by the packed-switched network 51 of the mobile network 20. On the second connection C2, i.e. on the connection dedicated for the video component, a throughput of at least 10 kbit/s should be preferably available, more preferably of at least 20 kbit/s, in order to allow transmission of a video having an acceptable quality.

The establishment of the first and of the second connections C1, C2 may be controlled by suitable software installed on the mobile stations 12, 14. Preferred embodiments may provide that the packet-switched connection C2 between the mobile stations 12, 14 is established based on an acknowledgement of the establishment of the circuit-switched connection C1. In practice, this may be accomplished by causing, at the mobile stations 12, 14, the opening of a PDP (Packet Data Protocol) context towards a GGSN when an acknowledgement of the established circuit-switched connection C1 is received by the mobile station 12, 14 from the circuit-switched network (both in case of outgoing and incoming call).

The establishment of the packet-switched connection C2 may practically correspond to the establishment of a peer-to-peer session between the mobile stations 12, 14, in which the two mobile stations exchange with each other the addresses assigned thereof from the packet-switched network 51 (typically their IP addresses). A network apparatus could be used for managing the exchange of the network addresses. More particularly, in preferred embodiments it may be provided that each mobile station 12, 14 sends a signaling message to the network apparatus, including its network address and the telephone number of the other party. The network apparatus is adapted to obtain, for example from an Access Point Node (APN), the network addresses corresponding to the received telephone numbers, and matches these addresses with those received directly from the mobile stations 12, 14. In case of matching, the network apparatus then enables the exchange of the network addresses between the two mobile stations (for example by sending to at least one of the mobile stations, e.g. the mobile station 12, a signaling message including the network address of the other mobile station 14), i.e. the peer-to-peer session.

Alternative embodiments may take advantage of the infrastructure of the packet-switched network 51 for setting up a peer-to-peer session between the mobile stations 12, 14, without the need of a dedicated network apparatus. For example, the IMS (IP Multimedia Subsystem) infrastructure may be advantageously exploited in order to allow the mutual reaching of the mobile stations 12, 14 in the packet-switched network 51.

It is further noticed that the establishment of a "direct" peer-to-peer session between the mobile stations 12, 14 is not mandatory. A "mediator" network apparatus could be adapted for managing the communication between the mobile stations 12, 14, so that the mobile stations 12, 14 communicate with each other in the packet-switched network 51 through the mediator network apparatus.

The mobile station software could also include a suitable MMI (Man-to-Machine Interface) being adapted to assist the user of the video-communication service in the video transmission. For example, a "Send" icon could be made available once the mobile station is made aware of the fact that packet-switched connection C2 has been set-up. A corresponding soft-key on the keyboard of the mobile station, once pressed, enables the transmission of a video (taken in real-time from a video-camera incorporated in the mobile station, or stored in a memory area of the mobile station) to the other party, exploiting the packet-switched connection C2. A "Stop" icon could also be made available for enabling the user to stop the video transmission. Known protocols, e.g. of the IP suite, could be used for sending the video. For example, RTP/RTCP (Real-time Transport Protocol/RTP Control Protocol) could be exploited for sending a real-time video.

If the mobile network 20 is a 2G (e.g. an GSM/GPRS) network, the connections C1 and C2 may be exemplarily established by exploiting the DTM (Dual Transfer Mode) technology. For example, each of the connections C1 and C2 may use one timeslot on the uplink and one timeslot on the downlink. For such exemplary implementation, class 5 or class 9 mobile phones, allowing availability of at least one timeslot per direction on the packet-based connection C2, can be used. Reasonable throughputs per timeslot obtainable on the packet connection for the video component, using the EDGE (Enhanced Data rates for GSM Evolution) technology, are in the range from 10 to 40 kbit/s, sufficient for supporting a video transmission having a good or at least an acceptable quality. Higher throughputs could be obtained with a higher quality radio channel. With regards to the connection C1 dedicated to the voice component, a standard GSM connection can be used (half rate or full rate), or a higher speed ECSD (Enhanced Circuit Switched Data) connection.

If the mobile network 20 is a 3G (e.g. UMTS) network, the connection C1 (dedicated to the voice component) may exemplarily established as a 12.2 kbit/s circuit-switched radio access bearer (RAB), allowing a throughput of 12.2 kbit/s on both the uplink and the downlink channel, whereas the connection C2 (dedicated to the video component) may be exemplarily established as a 64 kbit/s packet-switched RAB, allowing a throughput of 64 kbit/s on both the uplink and the downlink channel. It is noticed that a 3G network allows, especially in the packet-switched domain, an available higher throughput than that allowed by a GPRS or EDGE network. Thus, a video component having a higher quality may be, generally, transmitted on the dedicated connection C2.

However, even in a 3G network the available throughput can significantly change as a function of the radio conditions, and/or of the level of congestion of the network. In this context, it is noticed that if the network resources are properly sized, and/or the packet-switched network is configured so as to give an adequate priority to the video-communication service, it can be assumed that the available throughput practically depends only on the radio quality conditions. It is further observed that the throughput fluctuations due to the radio channel quality conditions may vary very rapidly, in particular if at least one of the mobile stations 12, 14 is changing its geographical position. This may have a strong impact on the quality of the video transmitted on the packet-switched connection C2.

Figure 3:
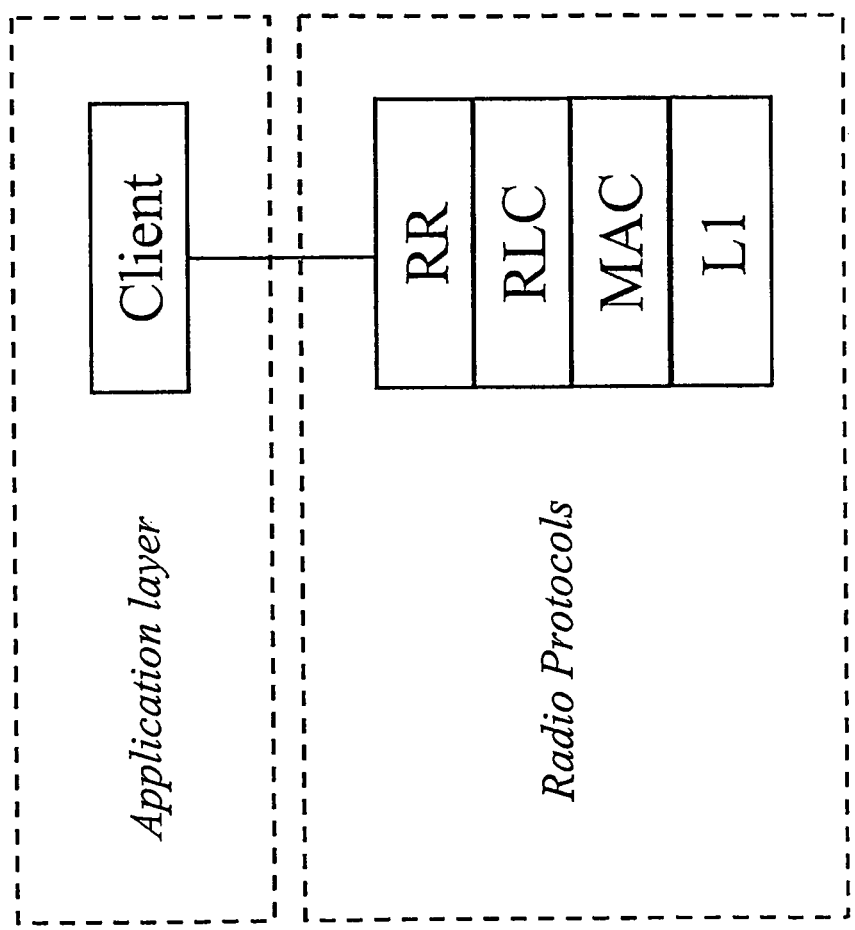
FIG. 3 schematically shows a communication between the application layer and the lower layers of a mobile station, exploited in the present invention.

In order to guarantee an acceptable quality of service (QoS) for the communication, the invention provides for a monitoring of the radio communication channel used for establishing the end-to-end connections between the first and the second mobile stations 12, 14. While the voice component may take advantage of QoS monitored circuit-based connection C1, the second connection C2 may be a best effort (i.e. with no native QoS monitoring) transport channel: a mechanism is introduced, at the mobile station 12, 14, adapted for adjusting at least one parameter related to the quality of the video component (e.g. changing the coding rate of the video codec, and/or the definition of the video image, and/or the size of the video image), as a function of an available bandwidth on the packet-switched connection, determined as a function of the radio channel quality on the packet-switched connection. For example, a suitable software program running at the application layer of the mobile station may interact with the lower layers, especially the RRC, the RLC/MAC and the physical layer, as schematically shown in FIG. 3, in order to monitor the radio channel quality. In particular FIG. 3 shows the application protocols, the radio protocols and a related point of inter-working. In the radio protocols block, the three main radio protocols—RR (Radio Resource) RLC (Radio Link Control) and MAC (Medium Access Control)—and the Layer 1 (L1)—or physical layer—are shown. The RR protocol exists only on the signaling plane and is responsible for the management of radio resources; the RLC is the protocol layer that takes care of retransmissions over the radio interface for those blocks that were received erroneously, both at the mobile station side and at the network side. The MAC layer is responsible for implementing mechanisms for the sharing of different resources and channels among different users. The physical layer is the protocol layer that implements the functionality of transmission and reception of data over the radio channel. More particularly, the RR protocol, in conjunction with the physical layer (L1), takes care of the execution and reporting to the network of the radio measurements. As it will be described in detail in the following, many different metrics are available and can be used for evaluating the quality of the radio channel on the packet-switched connection, at all the above mentioned layers.

While the service is ongoing, the quality of the radio channel (e.g. of the downlink channel) of the packet-switched connection is continuously monitored (typically at pre-defined time periods) by the mobile stations 12, 14. Based on the result of the monitoring, a parameter related to the quality (e.g. the coding rate) of the video component to be transmitted/received is adjusted at the mobile stations 12, 14. Threshold-based mechanisms may be exploited, in which the video quality is increased when the radio channel quality is higher than (or equal to) the threshold, or reduced when the radio channel quality is lower than (or equal to) the threshold. Exchange of signaling messages between the mobile station 12 and the mobile station 14 may be provided, in order to allow a correct adjustment of the video quality at both ends of the communication.

Figure 4:
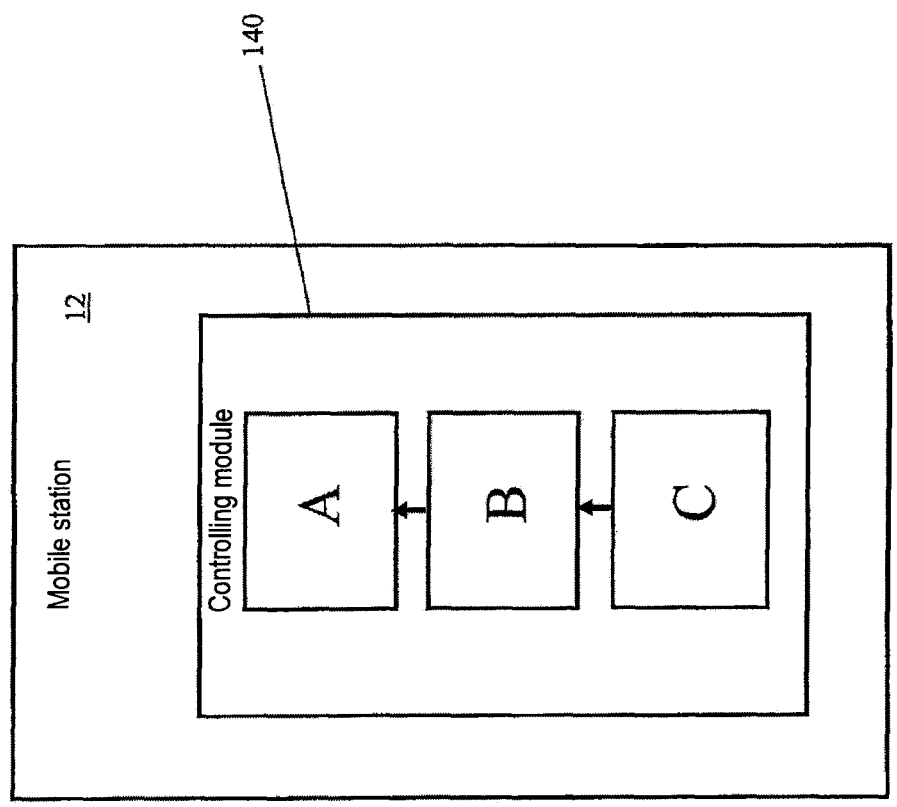
FIG. 4 schematically shows functional blocks of a controlling module of a mobile station, being adapted to carry out a video-communication service according to the invention.

Exemplarily, a controlling module 140 may be included in the generic mobile station 12, as schematically shown in FIG. 4. The controlling module may comprise three main functional blocks. The first block (block A) is adapted to the coding and decoding of the video part. Additionally, it may be also adapted to the coding and decoding of the voice component. The third block (block C) is adapted to monitor the radio quality of the downlink path associated to the mobile station. The second block (block B) is adapted to filter the measurements taken as an input from the third block C, in order to determine which coding rate can be chosen coherently with the current radio conditions. Block B then forwards such information to block A, which sets its coding/decoding rate accordingly.

Available metrics for measuring the radio channel quality in block C may be, for example, the C/I (i.e. the signal to interference ratio), and/or the BLER (Block Error Ratio, i.e. the ratio of the blocks received with errors versus the total number of received blocks), and/or the RSSI (Received Signal Strength Indicator, i.e. the overall power in the frequency band measured at the receiver of the mobile station), and/or the radio throughput on the uplink or downlink (i.e. the number of blocks transmitted/received in a predetermined time at the radio levels, e.g., at the RLC level). Other metrics, available in a GSM/GPRS context, may comprise one or more among the following:

RXLev: a measurement of the strength of the signal received by the base station during a session or call.

RXQual: a measurement of the bit error rate of the received signal during a session or call.

MCS (Modulation Coded Scheme) used and related BLER (BLock Error Rate): a measurement of the BLER associated to the type of modulation scheme used in a transmission.

Still other metrics, available in a UMTS context, may comprise one or more among the following:

CPICH power: the power level associated to the Common Pilot Channel, i.e. the channel on which the radio procedure (e.g. Cell selection/reselection, soft handover) in UMTS are based;

CPICH Ec/I0: the ratio of the energy spectral density over the overall interference spectral density associated to the CPICH;

$\Delta$ SIR: the difference between the current SIR (Signal Interference Ratio) and a SIR target;

RTWP (Receive Total Wideband Power): a parameter broadcasted by the network that gives an indication of the level of load of a cell.

However, it is noticed that a suitable metrics for evaluating the radio channel quality may be chosen in dependence of many factors, such as the mobile station model, the operating system used by the mobile station software, etc.

As a function of the chosen metric, block B may use an averaging window in order to filter the raw measurement samples received by block C. The resulting average value AVG may be compared with predetermined thresholds, which values can be also selected depending on the nature of the chosen metric. For example, in case three thresholds are identified as Th_1, Th_2, Th_3 with Th_3>Th_2>Th_1, if Th_3<=AVG<=Th_2 then block B may select a "high quality coding" status, referred as "High_Cod", characterized by the highest possible transmission parameters; on the other hand if Th_2<=AVG<Th_1 then block B may select a "medium quality coding" status, referred as "Med_Cod", characterized by medium transmission parameters; if AVG<=Th_1 then block B may select a "low quality coding" status, referred to as "Low-Cod", characterized by lower transmission parameters.

The status determined by block B affects the video quality generated and transmitted by the coding portion included in block A, quickly reducing the generated video bandwidth in case of a radio channel's quality drop, and/or increasing the same in the opposite case. In order to limit video quality fluctuation, the decision to raise the video bandwidth should be taken also taking into account the radio channel status of the mobile station of the other party, by sharing the radio channel metric. Advantageously, this solution offers a faster video quality adjustment compared to the standard RTCP with RTT (Round Trip Time) measurement and statistics report mechanism.

In greater detail, possible behaviors of the clients executed at the mobile stations 12, 14 could be summarized as follows:
- On the video transmitting side, if block C detects a radio channel's quality worsening, block A notifies the receiving side's block A about its radio channel status variation and decreases the video bandwidth;
- On the video receiving side, if block C detects a radio channel's quality worsening, block A notifies the transmitting side's block A about its radio channel status variation, in order to force a video bandwidth reduction;
- On the video transmitting side, if block C detects a radio channel's quality improvement, block A notifies the receiving side's block A about its radio channel status variation, and waits for a feedback thereof before actually increasing the video bandwidth;
- On the video receiving side, if block C detects a radio channel's quality improvement, block A notifies the transmitting side's block A about its radio channel quality status variation, in order to allow a video bandwidth increase.

For example, a possible implementation may adjust the coding rate of the video component according to the following rules:

a) if $C/I \geq 18$ dB (very good channel), then the coding rate is adjusted to at least 30 kbit/s;
b) if $12 \text{ dB} \leq C/I < 18$ dB (medium quality channel), then the coding rate is adjusted around 20 kbit/s, e.g. in a range between 18-22 kbit/s;
c) if $9 \text{ dB} \leq C/I < 12$ dB (low quality channel), then the video transmission is changed from motion video transmission to still images transmission;
d) if $C/I < 9$ dB (bad radio channel), then the video transmission is stopped (a courtesy message may be shown to the user, explaining that the video service is not available).

It is observed that all the values in dB for the C/I thresholds, as well as the throughput values in kbit/s of the coding rate are purely exemplary; the skilled in the art can set the thresholds and the video quality according to its own requirements and/or according to the characteristics of the network used. Furthermore, metrics equivalent to the C/I can be used, as disclosed above.

The monitoring of the radio channel and the setting of the video quality parameters may be carried out during the packet-switched connection setup and/or during the video transmission on the established packet-switched connection.

Figure 5:
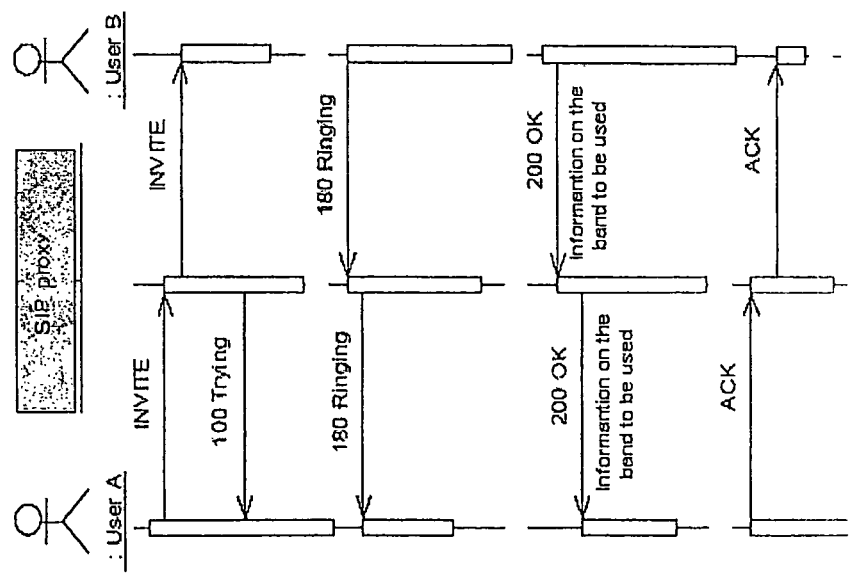
FIG. 5 schematically shows signaling messages between the mobile stations of two users in an exemplary video-communication service according to the invention.

FIG. 5 exemplarily shows a diagram related to a possible implementation of a setup of a packet-switched connection between two users, User A and User B, for example owning the mobile stations 12, 14 of FIG. 2, in which a setting of the video parameters is performed. The implementation shown in FIG. 5 is based on an IMS architecture and on SIP (Session Initiation Protocol) signaling messages. In particular, it is assumed that the signaling messages originated by the mobile stations of the users are managed by an apparatus denoted as "SIP Proxy" in FIG. 5.

With reference to FIG. 5, in order to start a video communication session the mobile station of User A sends an "INVITE" signaling message to the mobile station of User B. The SIP Proxy sends a "100 Trying" signaling message to the mobile station of User A, during the search of the mobile station of User B in the packet-switched network. Once reached by the "INVITE" message, the mobile station of User B answers with a "180 Ringing" signaling message, and when User B accepts the video communication session, with a "200 OK" signaling message. The signaling messages originated by the mobile station of User B are forwarded to the mobile station of User A by the SIP Proxy. At the reception of the "INVITE" message, the mobile station of User B evaluates its radio channel quality and selects an adequate desired video coding set of parameters, based on the radio channel quality evaluation. The desired video quality set can be included in extension fields of the SDP (Standard Description Protocol) of the "200 OK" message sent to the mobile station of User A, for example as a bandwidth/coding rate to be used. In its turn, the mobile station of User A was evaluating its radio channel quality, and determining its desired video quality set accordingly. When receiving the information from the mobile station of User B, the mobile station of User A can properly select the bandwidth/coding rate to be used for the video transmission, taking into account of the own radio channel quality and of the radio channel quality of User B. An acknowledge message "ACK" is also sent by the mobile station of User A to the mobile station of User B for completing the establishment of the packet-switched connection.

During the video transmission on the established packet-switched connection, event triggered mechanisms may be exploited for the purpose of synchronization between the two mobile stations involved in the communication. Whenever a mobile station detects a change in the radio channel status, thanks to the monitoring and filtering blocks B and C, block A can be exploited for signaling to the other mobile station's block A the occurred change and the possibility of changing at least one of video transmission parameters.

In order to perform the signaling between the two mobile stations, proprietary protocols may be implemented, or known protocols may be adapted. For example, a standard feedback provided by RTP/RTCP reports can be used, by exploiting statistic fields reporting the loss percentage status, the error rate status, the jitter status, etc. Alternatively or in combination, proprietary information could also be defined and included in extension fields of the RTP/RTCP reports, the proprietary information being for example related to the metric and/or to the thresholds used. Application level messages may also be defined, for example for choosing the video quality level suitable for both radio link conditions. Signaling messages, for example SIP-based signaling messages, could be exploited for the purpose, enclosing information on the metric used, and/or to the thresholds used, and/or on the available bandwidth. For example, SIP "INFO" or "re-INVITE" messages could be adapted for the purpose.

Figure 6:
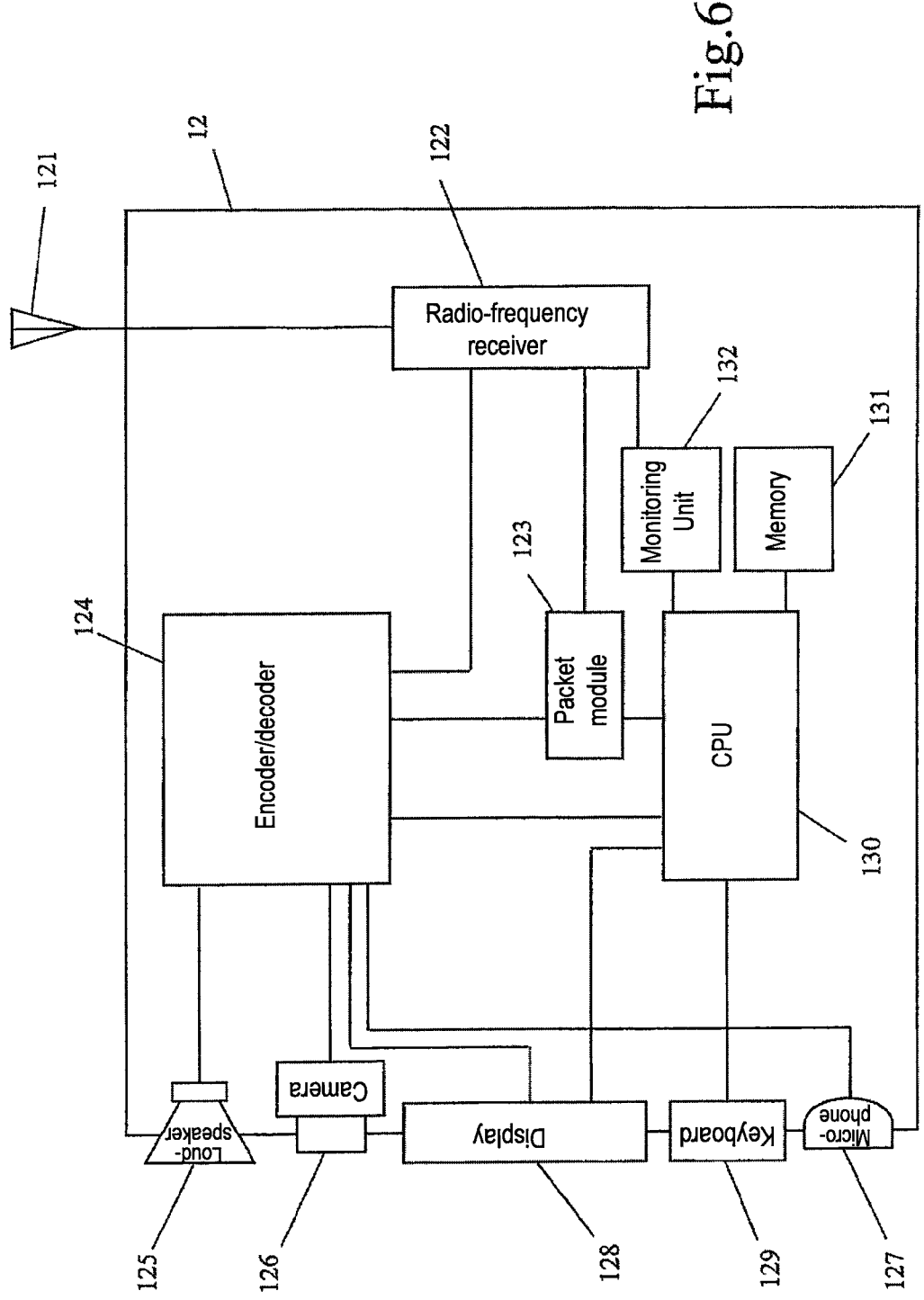
FIG. 6 schematically shows an exemplary mobile station adapted for carrying out a video-communication service according to the invention.

FIG. 6 shows an exemplary mobile station, e.g. a mobile telephone 12 adapted for carrying out a video-communication service according to the invention. The mobile telephone 12 comprises a transmit/receive antenna 121, a radio frequency transceiver 122, a packet module 123, an encoder/decoder 124, a loudspeaker 125, a video-camera 126, a microphone 127, a display 128, a keyboard 129, a central processing unit (CPU) 130 with an associated memory 131, a monitoring unit 132. The mobile telephone 12 may be typically associated with a removable subscriber identity module (SIM), not shown in FIG. 6, via electrical contacts.

The antenna 121 and the radio-frequency transceiver 122 conventionally allow communication to/from the BTSs of the mobile network. The loudspeaker 125 and the microphone 127 conventionally transform an electrical signal corresponding to the speech component of the communication in a speech signal audible to a user owning the mobile station 12, and viceversa. The keyboard 129 conventionally allows the user to manually interact with the mobile telephone, in order to send commands for, e.g., a choice from a menu of different options, or from a softkey, or for selection of a phone number, etc. The display 128 may be, for example, a liquid crystal display (LCD), and is conventionally capable of displaying still and video images. The video-camera 126, for example a CCD (Charge-Coupled Device) camera, is conventionally capable of picking still and/or video images. The packet module 123 conventionally includes a packetiser/depacketiser, and a buffer store, for the packing/unpacking of the data packets from the radio blocks respectively received from or to be sent to the network, via the radio-frequency transceiver 122 and the antenna 121. The CPU 130 supervisions the activities of the various modules included in the mobile station 12. The memory 131, associated with the CPU 130, includes software programs implementing procedures and protocols needed for properly managing the communication, including the establishing of the packet-switched and of the circuit-switched connections, and/or the video transmission, and/or the adapting of the video transmission to the radio channel quality status, and/or the synchronization of the video communication with another generic party. The monitoring unit 132, associated with the CPU 130 and with the transceiver 122, allows a monitoring of the quality of the radio channel, making available information to be used by the software included in the telephone memory 131 for determining the video parameters, as explained above.

The encoder/decoder unit 124 is connected to the loudspeaker 125, to the microphone 127, to the display 128, to the video-camera 126, and manages the proper coding/encoding of video and voice components of the video-communication, under the control of the CPU 130 and its associated memory 131. While in FIG. 6 the encoder/decoder unit 124 has been shown as a separate entity, it may be realized as a particular software program stored within the memory 131. Moreover, the encoder/decoder unit 124 may perform the adjustment of the parameters of the video to be transmitted on the packet-switched connection, as discussed above.

Figure 7:
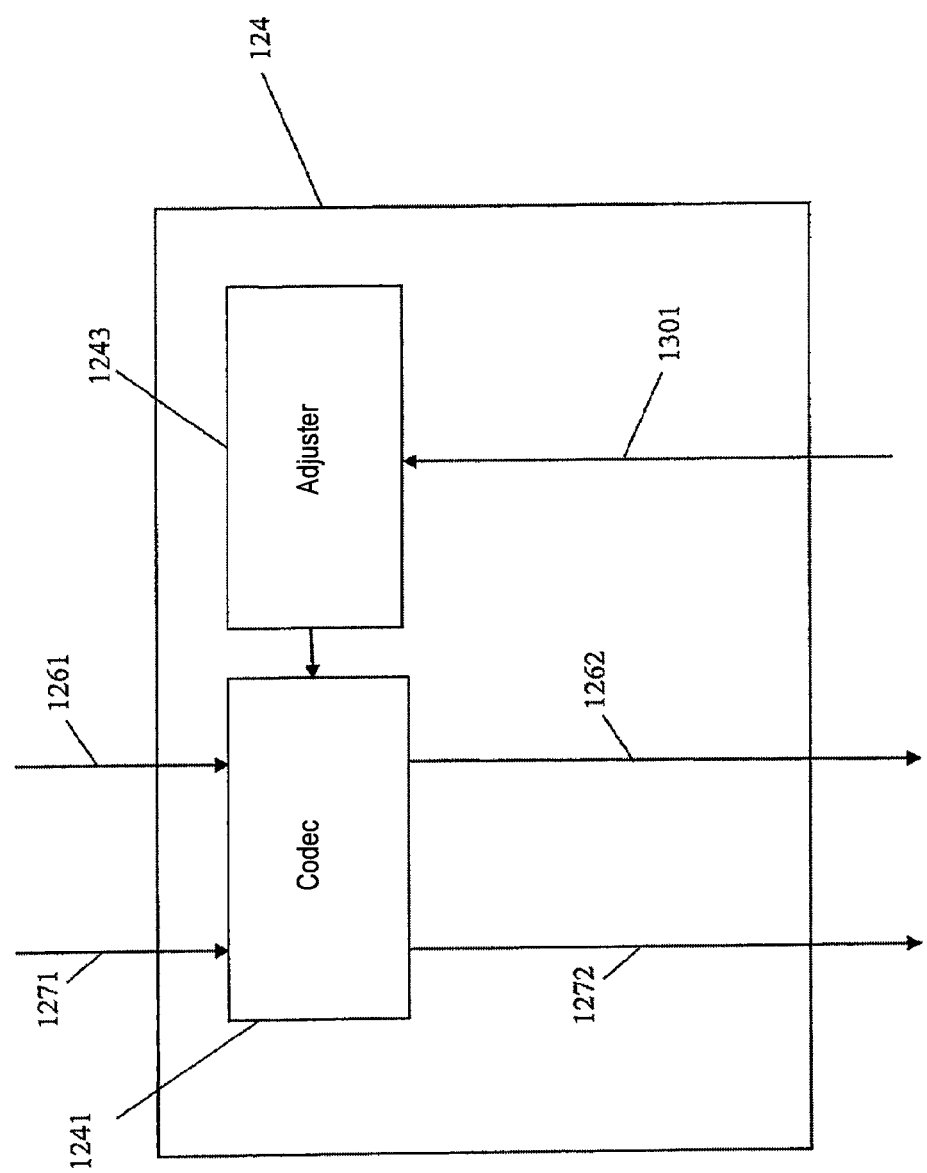
FIG. 7 schematically shows a possible implementation of a coding/decoding unit to be used in a mobile station adapted for carrying out a video-communication service according to the invention.

In more detail, FIG. 7 schematically shows a possible implementation of an encoding/decoding unit 124 adapted to be used in a mobile station 12 such as that shown in FIG. 6.

The encoding/decoding unit 124 comprises an encoder/decoder (or codec) 1241, in which a proper coding rate is applied to a voice component 1271, originated from the microphone 127 (see FIG. 6), and to a video component 1261, originated from the video-camera 126 (see FIG. 6). FIG. 7 shows the voice and video fluxes entering the codec 1241 as separate: however, a single communication flux, comprising both the video and the voice component, may be also inputted/outputted to/by the codec 1241.

The codec 1241 outputs two separate coded streams, a first one 1272 for the voice component and a second one 1262 for the video component. An adjuster 1243 may interact with the codec 1241, in order to adjust the quality (e.g. of the coding rate) of the communication streams. This particularly applies for the coding of the video stream component 1262. The adjustment of the coding rate (or of any other parameter related to the quality of the communication streams) may be based on data 1301 related to the quality of the radio communication channel, as discussed above. Such data 1301 may be made available, for example, by the CPU 130 (see FIG. 6), that may command and supervision the monitoring of the radio channel. In one embodiment, not shown in FIG. 7, a plurality of codec, such as the codec 1241 of FIG. 7, may be provided, each of which being adapted to work at a respective coding rate. In this embodiment, the adjuster 1243 may select the proper codec (i.e. the proper coding rate) based on data 1301.

The voice and video streams 1272, 1262, outputted from the codec 1241, are then sent towards the radio-frequency transceiver 122, possibly via the packet module (for the video component) 123 (see FIG. 7), for transmission on the separate connections C1 and C2 (see FIG. 2).

The behavior of the encoding/decoding unit 124 during reception from the separate connections C1 and C2 may be inherited from FIG. 7, simply by reversing the orientation of the arrows representing the separate video and audio streams (1261, 1271, 1262, 1272). During reception, proper decoding of the audio and video components is performed at the codec 1241, possibly with the aid of the adjuster 1243 for the adjustment of, e.g., the coding rate for the decoding. After decoding, the audio and video components are then forwarded, respectively, to the loudspeaker 125 and to the display 128 (see FIG. 6), in order to be played.

Although the present invention has been disclosed by way of some embodiments thereof, it is apparent to those skilled in the art that that several modifications are possible without departing from the scope of the present invention, as defined by the following claims. In particular, while in the previous description embodiments have been disclosed in which the voice and the video component are carried by different connections C1 and C2, this should not considered as limiting the invention. The possibility of carrying both a voice and a video component on the same packet-switched connection is contemplated. Furthermore, it is noticed that embodiments in which only a video component is transmitted on the packet-switched connection is also contemplated.

The invention claimed is:

1. A method of performing a communication between a first and a second user in a mobile communication network, the first and the second users being provided with respective first and second mobile stations, comprising:
    establishing a packet-switched connection between said first and said second mobile station, the packet switched connection comprising at least one radio channel portion;
    transmitting a video component from said first to said second mobile station on said packet-switched connection;
    continuously monitoring, during the transmitting, a quality of said at least one radio channel portion; and
    adjusting, by the first mobile station or the second mobile station during the transmitting, at least one parameter related to quality of said video component as a function of an available bandwidth on the packet-switched connection, based on a result of said monitoring.

2. The method of claim 1, wherein the monitoring of the quality of said radio portion comprises determining if the radio channel portion quality is above a first predetermined threshold.

3. The method of claim 1, wherein a metric for measuring the radio channel portion quality is based on at least one among the following: signal over interference ratio, block error ratio, overall power in band, radio throughput, received signal strength, bit error rate, power level associated with a pilot channel, energy spectral density associated with a pilot channel, and load of a cell of said mobile communication network.

4. The method of claim 2, wherein the adjusting of said at least one parameter related to said quality of said video component comprises selecting a higher coding rate if said radio channel portion quality is above said first predetermined threshold.

5. The method of claim 1, wherein the monitoring of said radio channel portion quality comprises determining if said radio channel portion quality is below a second predetermined threshold.

6. The method of claim 5, wherein said first predetermined threshold is higher than said second predetermined threshold.

7. The method of claim 6, wherein the adjusting of said at least one parameter related to said quality of said video component comprises generating a plurality of still images if said radio channel portion quality is below said second predetermined threshold.

8. The method of claim 1, wherein said transmitting of said video component is performed at a coding rate of at least 10 kbit/s.

9. The method of claim 8, wherein said coding rate is at least 20 kbit/s.

10. The method of claim 1, further comprising establishing a circuit-switched connection between said first and said second mobile station.

11. The method of claim 10, wherein the establishment of said packet-switched connection is started based on a reception, at the first or second mobile station, of an acknowledgement of the establishment of said circuit-switched connection.

12. The method of claim 1, wherein said at least one radio channel portion comprises a first radio channel portion between the first mobile station and an associated first base transmitter station.

13. The method of claim 12, wherein the monitoring of the quality of said radio channel portion comprises a monitoring of a quality of said first radio channel portion performed by said first mobile station.

14. The method of claim 13, further comprising determining an available first bandwidth on the first radio channel portion, based on said monitoring of the quality of said first radio channel portion.

15. The method of claim 14, wherein said at least one radio channel portion further comprises a second radio channel portion between the second mobile station and an associated second base transmitter station.

16. The method of claim 15, wherein the monitoring of the quality of said radio channel portion comprises a monitoring of a quality of said second radio channel portion performed by said second mobile station.

17. The method of claim 16, further comprising determining an available second bandwidth on the second radio channel portion based on said monitoring of the quality of said second radio channel portion.

18. The method of claim 17, wherein the adjusting of at least one parameter related to said quality of said video component based on a result of said monitoring of the quality of said radio channel portion comprises adjusting said at least one parameter based on a matching between the first and the second available bandwidth.

19. The method of claim 1, wherein the establishment of said packet-switched connection comprises an exchange of signaling messages between the first and the second mobile stations.

20. The method of claim 19, wherein said signaling messages comprise a first signaling message sent from the first mobile station toward the second mobile station.

21. The method of claim 20, wherein the determining of the first available bandwidth is performed after a transmission of said first signaling message from said first mobile station.

22. The method of claim 20, wherein the determining of the second available bandwidth is performed after a reception of said first signaling message at said second mobile station.

23. The method of claim 22, wherein said signaling messages comprise a second signaling message sent from the second mobile station to the first mobile station, subsequently to a reception of said first signaling message by said second mobile station.

24. The method of claim 23, wherein said second signaling message carries information related to said second available bandwidth.

25. A mobile station adapted for performing a communication in a mobile communication network, comprising:
a first unit adapted to code/decode a video component of the communication;
a second unit associated with the first unit, the second unit being adapted to establish at least a packet-switched connection comprising a radio channel portion, and to transmit said video component on said packet-switched connection; and
a third unit adapted to continuously monitor, during the transmitting, a quality of said radio channel portion,
wherein said first unit is associated with said third unit and said first unit is also adapted to adjust, during the transmitting, at least one parameter related to quality of said video component as a function of an available bandwidth on the packet-switched connection, based on an output of said third unit.

26. The mobile station of claim 25, wherein said third unit is also adapted to determine if the radio channel portion quality is above a first predetermined threshold.

27. The mobile station of claim 25, wherein a metric for measuring the radio channel portion quality is based on at least one among the following: signal over interference ratio, block error ratio, overall power in band, with radio throughput, received signal strength, bit error rate, power level associated with a pilot channel, energy spectral density associated with a pilot channel, signal to interference ratio, and load of a cell of said mobile communication network.

28. The mobile station of claim 26, wherein said first unit is adapted to select a higher coding rate of said video component if said radio channel portion quality is above said first predetermined threshold.

29. The mobile station of claim 25, wherein said third unit is also adapted to determine if said radio channel portion quality is below a second predetermined threshold.

30. The mobile station of claim 29, wherein said first predetermined threshold is higher than said second predetermined threshold.

31. The mobile station of claim 29, wherein said first unit is adapted to generate a plurality of still images if said radio channel portion quality is below said second predetermined threshold.

32. The mobile station of claim 25, wherein said first unit is adapted to code/decode said video component at a coding rate of at least 10 kbit/s.

33. The mobile station of claim 32, wherein said first unit is adapted to code/decode said video component at a coding rate of at least 20 kbit/s.

34. The mobile station of claim 25, wherein said second unit is also adapted to establish a circuit-switched connection.

35. The mobile station of claim 34, wherein said first unit is adapted to start the establishment of said packet-switched connection based on a reception of an acknowledgement of an establishment of said circuit-switched connection.

36. The mobile station of claim 25, wherein said third unit is also adapted to determine an available bandwidth on the radio channel portion, based on the monitoring of the quality of said radio channel portion.

37. The mobile station of claim 36, wherein said output of said third unit comprises said available bandwidth.

38. The mobile station of claim 25, wherein said second unit is also adapted to send or receive signaling messages on said packet-switched connection.

39. The mobile station of claim 38, wherein said signaling messages are exchanged with a further mobile station.

40. The mobile station of claim 39, wherein said signaling messages comprise a first signaling message sent from the mobile station toward said further mobile station.

41. The mobile station of claim 40, wherein said third unit is adapted to determine said available bandwidth after a transmission of said first signaling message from said mobile station.

42. The mobile station of claim 39, wherein said signaling messages comprise a second signaling message received by some mobile station from said further mobile station.

43. The mobile station of claim 42, wherein said third unit is adapted to determine said available bandwidth after a reception of said second signaling message at said second mobile station.

44. The mobile station of claim 43, wherein said second unit is also adapted to send a third signaling message from the mobile station to the further mobile station, subsequently to a reception of said second signaling message by said mobile station.

45. The mobile station of claim 44, wherein said third signaling message carries information related to said available bandwidth.

\* \* \* \* \*